United States Patent

Rogers et al.

[15] 3,635,302

[45] Jan. 18, 1972

[54] VEHICLE BODY COUPLING

[72] Inventors: John A. Rogers; Fredrick R. Bossard, both of Fort Dodge, Iowa

[73] Assignee: Standard Engineering Co., Inc., Fort Dodge, Iowa

[22] Filed: Dec. 19, 1969

[21] Appl. No.: 886,473

[52] U.S. Cl. ............................ 180/44 R, 280/111, 280/504
[51] Int. Cl. ......................................................... B60d 1/00
[58] Field of Search ............... 180/14, 51, 52, 44; 280/492, 280/111, 504

[56] References Cited

UNITED STATES PATENTS

| | | | |
|---|---|---|---|
| 3,189,117 | 6/1965 | Ammon | 180/51 |
| 3,437,163 | 4/1969 | Lemmerman | 180/51 |
| 3,240,284 | 3/1966 | Finneman | 280/492 X |
| 3,414,072 | 12/1968 | Hodges | 180/14 X |
| 3,426,720 | 2/1969 | Enos | 280/111 |

FOREIGN PATENTS OR APPLICATIONS 542,366   6/1957   Canada................................180/51

*Primary Examiner*—Kenneth H. Betts
*Attorney*—Zarley, McKee & Thomte

[57] ABSTRACT

A vehicle having front and rear body units rotatably connected by a body coupling for rotational movement about an axis parallel to the longitudinal axis of the vehicle. The coupling includes a hollow male member carried on the rear wall of the front body unit and extends through a sleeve carried on the front wall of the rear body with each being rigidly connected to their respective body walls by mounting plates. A plurality of bolt members extend outwardly from the inner peripheral surface of the hollow male member and extend through an end plate adapted to limit longitudinal movement of the sleeve on the male member. Wear plates are provided between the adjacent front and rear body walls and the end plate may be tightened against the sleeve as it is appropriate to compensate for wear on the wear plates.

10 Claims, 3 Drawing Figures

PATENTED JAN 18 1972

3,635,302

INVENTORS
JOHN A. ROGERS
FREDRICK R. BOSSARD
BY
Zarley, McKee & Thomte
ATTORNEYS

VEHICLE BODY COUPLING

All terrain-type vehicles must be rugged and easily assembled and maintained. A critical structural part of the two body unit vehicle of this invention is the coupling between the front and rear body units.

Because the vehicle of this invention includes a coupling for a rotational movement between the front and rear body units it is possible to maintain the drive wheels on each body unit in ground contact at all times since the body units will tend to float over the ground and rotate as necessary. The drive shaft extending from the engine in the front body unit passes through the coupling to the drive wheels on the rear body unit.

It is desirable to maintain the body units as close together as possible without incurring wear on the respective adjacent walls. Accordingly, wear plates are provided to maintain a small spacing between the body units. As the wear plates wear through extended use the coupling can be quickly adjusted to compensate for this wear.

The coupling can be disassembled allowing the front and rear body units to be separated by merely removing a plurality of nuts connecting an end plate on the rearwardly extending hollow male member which passes through the female sleeve carried by the wall of the rear body unit. Thus it is seen that the load of the rear body unit is pulled by the coupling unit and the force is transmitted through the female sleeve to the end plate and then forwardly through the male hollow member carried on the front body unit.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figures 1, 2, 3:
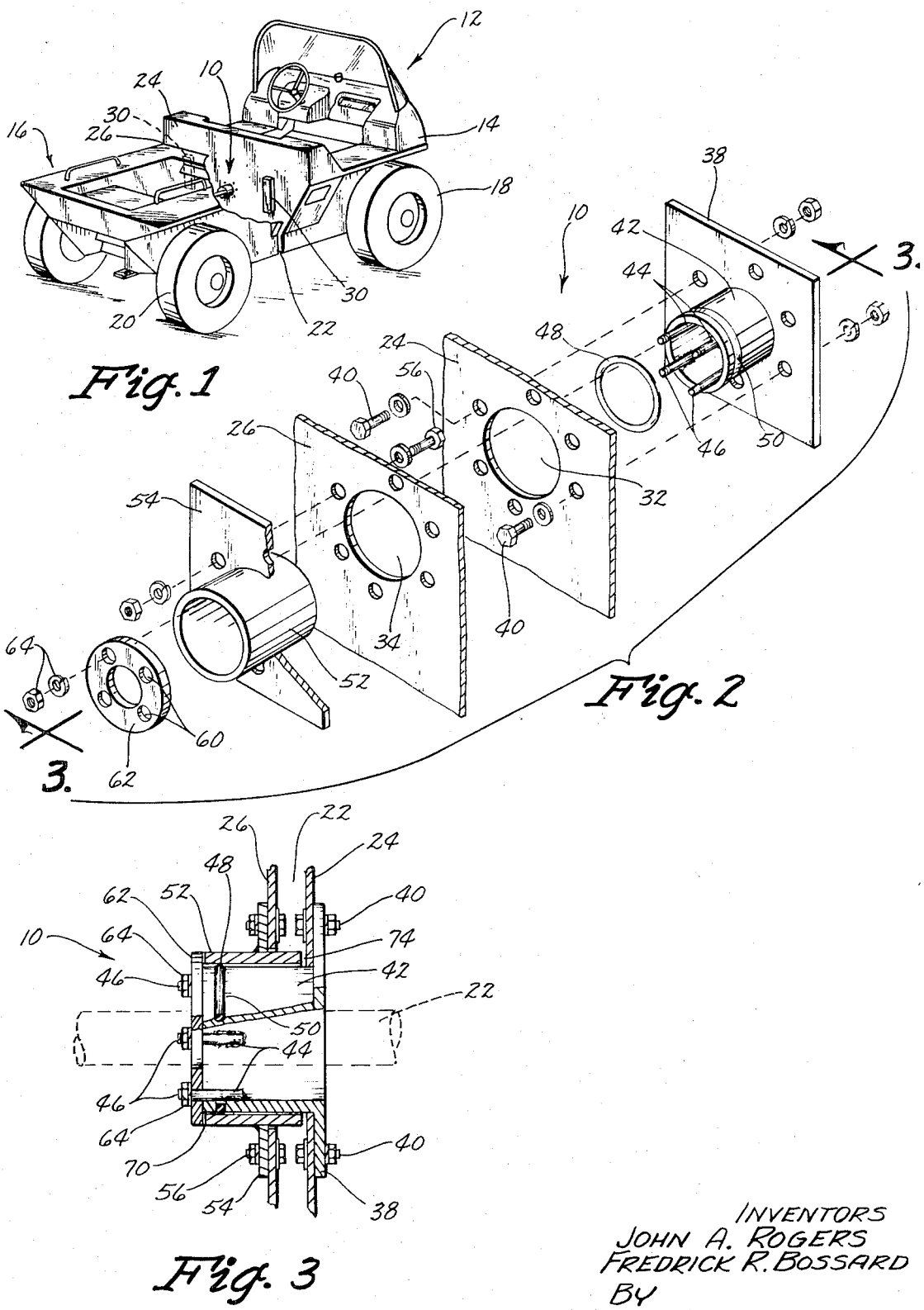
FIG. 1 is a fragmentary perspective view of a two body unit vehicle employing a body coupling of this invention.
FIG. 2 is an exploded fragmentary view of the coupling unit.
FIG. 3 is a cross-sectional view taken along lines 3—3 in FIG. 2.

The body coupling of this invention is referred to generally in FIG. 1 by reference numeral 10 and is shown on a vehicle 12 having a front body unit 14 and a rear body unit 16.

The engine for the vehicle 12 is located in the front body unit 14 and is coupled to front drive wheels 18 and to rear drive wheels 20 by drive shaft 22 extending through the body coupling 10.

A predetermined limited space 22 as seen in FIG. 3, is provided between the adjacent front and rear body walls 24 and 26 respectively and a pair of wear plates 30 of wood or the like material are mounted on the wall 24 of the body unit 14.

The front body wall 24 includes a circular opening 32 aligned with a similar circular opening 34 in the wall 26 of the rear body unit. A mounting plate 38 is secured to the front body wall 24 by a plurality of bolts and nuts 40 positioned around the periphery of the opening 32. The mounting plate 38 includes an integrally rearwardly extending hollow male cylindrical member 42 having a plurality of rod members 44 welded to the inner peripheral surface and having threaded free ends 46.

An O-ring 48 embraces the hollow member 42 and is received in an annular groove 50 adjacent the outer free end where the greater stresses occur during operation.

A female sleeve member 52 is welded to a mounting plate 54 in turn secured to the rear body wall 26 by bolts and nuts 56 extending around the periphery of the opening 34. It is thus seen in FIG. 3 that the male member 42 is received in the female member 52 and the rods 44 extend rearwardly beyond the female sleeve 52 and pass through opening 60 around the periphery of an end plate 62. Nuts and washers 64 are provided on the threaded ends 46 of the rods 44 to adjustably lock the coupling together.

It is to be noted that the end plate 62 and the mounting plate 38 on the front body unit wall 24 define an annular race in which the female sleeve 52 carried on the rear body wall 26 is positioned. The female sleeve member 52 may move forwardly and rearwardly in the race as permitted by the wear plates 30 between the front and rear unit body walls 24 and 26. The race is longer in width than the length of the male hollow member 42 and thus a rear space 70 adjacent the end plate 62 is provided along with a forward space 74 adjacent the mounting plate 38. Accordingly, as the wear plates 30 wear down the nuts 64 may be tightened to move the rear wall 26 closer to the wall 24 of the front unit 14.

Preferably the end plate 62 is made of bronze material or a similar hard material compared to the steel alloy of the female sleeve member 52 to minimize the wear between these two parts.

Thus it is seen in operation that all that is necessary to disassemble the body coupling 10 is to remove the nuts 64 on the rods 44 thereby allowing the end plate to be removed and the rear body unit 16 to be moved rearwardly away from the body unit 14 while the female sleeve 52 moves off of the hollow male member 50 carried by the front body unit 14. The respective body walls 24 and 26 will move apart as the body units 14 and 16 are separated. The assembly of the vehicle will be accomplished by following the reverse procedure.

It is seen that a minimum of rotational wear will occur on the coupling by providing the O-ring 48 at the rear end of the male hollow member 50 where the greatest stresses occur due to bending moments on the vehicle along the longitudinal axis.

It is further seen that through use of the coupling of this invention the front and rear body units 14 and 16 may be maintained relatively rigid allowing only rotational relative movement therebetween about an axis parallel to the longitudinal axis of the vehicle 10. Stated otherwise, the adjustment provided by the threaded rods 44 and the nuts 46 make it possible to maintain the desired pressure on the wear plates 30 between the front and rear body walls 24 and 26 and thus establish a longitudinally rigid vehicle which is adapted to provide for rotation relatively between the front and rear body units as the vehicle moves over rough terrain which requires maintaining the drive wheels 18 and 20 in contact with the ground at all times.

We claim:

1. In a vehicle having front and rear wheeled body units rotatably interconnected for rotation about an axis parallel to the longitudinal axis of said vehicle, a coupling for rotatably interconnecting said front and rear body units, said coupling including a hollow male member extending rearwardly from said front body unit, a female sleeve carried on said rear body unit and said male member being rotatably received therein, and an end plate secured to said male member at its free end for locking said sleeve on said male member thereby limiting longitudinal movement of said sleeve and said rear body unit, said end plate being secured to said body member is further defined by said male hollow body member as including a plurality of longitudinally outwardly extending rods being rigidly secured to the inner peripheral sidewall of said male hollow body member, and adjustable locking means secured to said bolts outwardly of said end plate.

2. The structure of claim 1 wherein said front and rear body units include adjacent body walls having aligned openings in which said male member and said female sleeve are positioned, a separate mounting plate is rigidly secured to said male member and said female sleeve and said front and rear body unit walls are rigidly secured to said respective mounting plates.

3. The structure of claim 2 wherein an O-ring embraces said male body member inside said female sleeve and in frictional contact therewith.

4. The structure of claim 3 wherein said O-ring is positioned in an annular groove formed adjacent the outer free end of said male hollow member.

5. The structure of claim 1 wherein said end plate is adapted to matingly frictionally engage the adjacent end of said sleeve and the outer end of said male hollow member is spaced inwardly from said sleeve.

6. The structure of claim 5 wherein nonmetallic wear members are mounted between said front and rear walls to maintain said walls in a predetermined spaced apart relationship.

7. The structure of claim 6 wherein said end plate and said mounting plate on said male hollow member define an annular race in which said female sleeve is longitudinally and rotatably mounted, and said sleeve having a length which is less than the length of said longitudinal width of said race whereby said adjustable locking means can be selectively adjusted to compensate for wear on said wear members.

8. The structure of claim 7 wherein said end plate is formed of bronze and said female sleeve is formed of a steel alloy thereby minimizing wear on said end plate by said sleeve.

9. The structure of claim 7 wherein said vehicle includes a drive shaft extending between said front and rear body units and said drive shaft extends through said coupling including said hollow male member and said female sleeve.

10. In a vehicle having front and rear wheeled body units rotatably interconnected for rotation about an axis parallel to the longitudinal axis of said vehicle, a coupling for rotatably interconnecting said front and rear body units, said coupling including a hollow male member extending rearwardly from said front body unit, a female sleeve carried on said rear body unit and said male member being rotatably received therein, and a planar end plate secured to said male member at its free end by means permitting selectively longitudinally adjustably locking said sleeve on said male member thereby limiting longitudinal movement of said sleeve and said rear body unit and thereby permitting said sleeve to be adjustably positioned with respect to said male member to compensate for wear on said sleeve and said male member, said end plate being longitudinally movable with respect to said male member during adjustment.

* * * * *